United States Patent
Wu et al.

(10) Patent No.: US 9,323,916 B1
(45) Date of Patent: Apr. 26, 2016

(54) SECURE AUTHORIZATION FOR ACCESSING CONTENT ON A SHAREABLE DEVICE

(71) Applicant: Google Inc., Mountain View, CA (US)

(72) Inventors: Huahui Wu, Milpitas, CA (US); Nicolas Catania, Palo Alto, CA (US); Curtis Gerald Condra, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/766,822

(22) Filed: Feb. 14, 2013

(51) Int. Cl.
*G06F 21/44* (2013.01)
*H04L 29/06* (2006.01)
*G06F 21/62* (2013.01)

(52) U.S. Cl.
CPC ............... *G06F 21/44* (2013.01); *H04L 63/08* (2013.01); *H04L 63/102* (2013.01); *G06F 21/6218* (2013.01)

(58) Field of Classification Search
CPC ... H04L 63/08; H04L 63/102; G06F 21/6218; G06F 21/44
USPC ............................................................ 726/4
See application file for complete search history.

(56) References Cited

U.S. PATENT DOCUMENTS

| | | | | |
|---|---|---|---|---|
| 5,774,551 | A * | 6/1998 | Wu et al. ...................... 713/155 |
| 7,908,219 | B2 * | 3/2011 | Abanami ................ G06F 21/10 705/59 |
| 8,347,363 | B2 * | 1/2013 | Tanaka ................ G06F 17/3089 709/227 |
| 8,396,220 | B2 * | 3/2013 | Hu ....................... H04L 9/0827 380/270 |
| 8,510,808 | B2 * | 8/2013 | McNeil .................. H04L 63/08 709/201 |
| 8,539,534 | B2 * | 9/2013 | Mathews et al. .............. 725/91 |
| 8,613,070 | B1 * | 12/2013 | Borzycki ............ G06F 21/6218 726/8 |
| 8,640,204 | B2 * | 1/2014 | Karaoguz ............... G06F 21/10 726/2 |
| 8,826,390 | B1 * | 9/2014 | Varda .................. G06F 21/6218 726/4 |
| 8,862,894 | B2 * | 10/2014 | Hoffman ............. G06F 21/6218 705/908 |
| 9,189,645 | B2 * | 11/2015 | Borzycki ............ G06F 21/6218 |
| 2001/0037378 | A1 * | 11/2001 | Hirayama ..................... 709/219 |
| 2003/0005135 | A1 * | 1/2003 | Inoue et al. ................... 709/229 |
| 2004/0044774 | A1 * | 3/2004 | Mangalik et al. ............. 709/227 |
| 2004/0083215 | A1 * | 4/2004 | de Jong ............................ 707/7 |
| 2006/0073812 | A1 * | 4/2006 | Punaganti Venkata et al. .......................... 455/412.1 |
| 2006/0184802 | A1 * | 8/2006 | Ibrahim et al. ................ 713/189 |
| 2008/0189774 | A1 * | 8/2008 | Ansari et al. ...................... 726/7 |
| 2008/0209577 | A1 | 8/2008 | Vrielink et al. |
| 2008/0235733 | A1 * | 9/2008 | Heie et al. ........................ 725/46 |
| 2009/0164785 | A1 * | 6/2009 | Metke et al. .................. 713/169 |
| 2010/0293570 | A1 * | 11/2010 | Teraoka et al. ................ 725/31 |
| 2011/0055436 | A1 * | 3/2011 | Tsai et al. ....................... 710/29 |
| 2011/0066745 | A1 | 3/2011 | Olsson et al. |
| 2011/0113343 | A1 * | 5/2011 | Trauth .......................... 715/738 |
| 2011/0264817 | A1 | 10/2011 | Raveendran |
| 2011/0265157 | A1 | 10/2011 | Ryder |
| 2012/0093312 | A1 * | 4/2012 | Gammel et al. .............. 380/255 |

(Continued)

*Primary Examiner* — Harunur Rashid
*Assistant Examiner* — Shahriar Zarrineh
(74) *Attorney, Agent, or Firm* — Morris & Kamlay LLP (57) ABSTRACT

Described is a process for securely authorizing access to media content from a first device to a second device. Access to content may be authorized by performing authentication from the first device. Information used for authentication (e.g. login information) is not shared with the second device. Instead, a token may be used to authenticate the second device. The authorization process may be done in a secure manner by sharing only the generated token with the second device. Authentication information may not be derived from the token, and accordingly, even if the second device is not secure or the token is exposed, authentication information remains secure.

20 Claims, 4 Drawing Sheets

(56) References Cited

U.S. PATENT DOCUMENTS

| | | | |
|---|---|---|---|
| 2012/0157043 A1* | 6/2012 | LaJoie et al. | 455/407 |
| 2012/0210379 A1* | 8/2012 | McCoy et al. | 725/109 |
| 2012/0291140 A1* | 11/2012 | Robert | G06F 21/10 726/28 |
| 2012/0311723 A1* | 12/2012 | Britt, Jr. | G06F 17/30023 726/28 |
| 2013/0080544 A1* | 3/2013 | Lyons | 709/206 |
| 2013/0097233 A1* | 4/2013 | Raman et al. | 709/204 |
| 2013/0225080 A1* | 8/2013 | Doss et al. | 455/41.2 |
| 2014/0006190 A1* | 1/2014 | Loomis et al. | 705/18 |
| 2014/0244488 A1* | 8/2014 | Kim et al. | 705/39 |
| 2015/0120838 A1* | 4/2015 | Vadla Ravnas | 709/204 |

\* cited by examiner

SECURE AUTHORIZATION FOR ACCESSING CONTENT ON A SHAREABLE DEVICE

BACKGROUND

Devices such as laptops and handheld devices are capable of accessing media content from a content provider. These content providers often provide premium content upon payment of a one time a fee. For example, a user may wish to order a recently released movie, and in order to do so, the user must submit payment information to the content provider. When a user requests such premium content, the user must often submit sensitive information such as login credentials or payment information on the device accessing the premium content. This may be problematic when the user requires that the content be accessed from a device not belonging to the user such as a shared device. In such a scenario, ordering premium content requires the user to expose potentially sensitive information to a shared device.

BRIEF SUMMARY

Described are techniques and systems for securely authorizing access to media content from a shareable device. In an implementation, access to media content from a first device to a second device may be securely authorized. A first identification of a second device and a request to access the media content from the second device may be received from the first device. A user account associated with the first device may be verified and a token may be generated. The token may be associated with the first identification received from the first device and the token may be sent to the first device. The token and a second identification of the second device may then be received from the second device. The second device may be authenticated based on comparing the second identification received from the second device to the first identification associated with the received token. Based on the authenticating, access to the media content by the second device may be authorized.

In an implementation, access to media content from a first device to a second device may be securely delegated. A request to access the media content may be received from a first device. Access to the media content by the first device may be authorized based on information received from the first device. A first identification of a second device and a request to delegate access to the authorized media content to the second device may be received from the first device. A token may be generated and may be associated with the first identification received from the first device. The token may then be sent to the first device. The token and a second identification of the second device may be received from the second device. The second device may be authenticated based on comparing the second identification received from the second device to the first identification associated with the received token. Based on the authenticating, access to the authorized media content may be delegated to the second device.

In an implementation, a system may securely authorize access to media content. The system may include a first server, which may include a processor and communications circuitry for connecting to a first device and a second device. A first identification of a second device and a request to access the media content from the second device may be received from the first device. A user account associated with the first device may be verified and a token may be generated. The token may be associated with the first identification received from the first device and the token may be sent to the first device. The token and a second identification of the second device may then be received from the second device. The second device may be authenticated based on comparing the second identification received from the second device to the first identification associated with the received token. Based on the authenticating, access to the media content by the second device may be authorized.

In an implementation, a system may securely delegate access to media content. The system may include a first server, which may include a processor and communications circuitry for connecting to a first device and a second device. A request to access the media content may be received from a first device. Access to the media content by the first device may be authorized based on information received from the first device. A first identification of a second device and a request to delegate access to the authorized media content to the second device may be received from the first device. A token may be generated and may be associated with the first identification received from the first device. The token may then be sent to the first device. The token and a second identification of the second device may be received from the second device. The second device may be authenticated based on comparing the second identification received from the second device to the first identification associated with the received token. Based on the authenticating, access to the authorized media content may be delegated to the second device.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Described is a process for securely authorizing or delegating access to media content from a first device to a second device. For example, the first device may be a handheld device (e.g. a smartphone) and the second device may be a shared device (e.g. media device). In an example scenario, a user may wish to order a movie from a content provider using their own user account, but request that the movie be accessible by the shared device. In conventional systems, accessing the movie on the shared device would require the user entering information for verifying their user account (e.g. login identification and password) directly on the shared device. In an example implementation, authentication may be based on information entered into the user's own handheld device and the user may authorize or delegate access to the movie to a shared device. For example, the user may order a movie from their handheld device by logging into their user account and then request that the shared device be authorized to stream the movie. Delegating access may be required instead of authorizing additional devices in order to comply with Digital Rights Management (DRM) policies. For example, DRM settings may only allow one device to access the content at a time.

In order to ensure that potentially sensitive information remains secure, implementations may not share information used for authentication (e.g. login information) with the shared device. Instead, a token may be used to authenticate the shared device. This token may be associated with identification information of the shared device and stored by a server. This token may be forwarded to the shared device and the shared device may send the token to a server responsible for authentication. The server may use the token in combination with identification information of the shared device to authenticate the shared device. Upon authentication, the server may authorize access to the media content by the shared device. The token may also be used to verify additional access rights to the media content by the shared device. The token may be a randomly generated or arbitrary value, and therefore, authentication information may not be derived from the token. Thus, if the shared device is not secure or is compromised, only the generated token may be exposed. Accordingly, even if the token is exposed or intercepted by a malicious third party, the user's authentication information remains secure.

Figure 1:
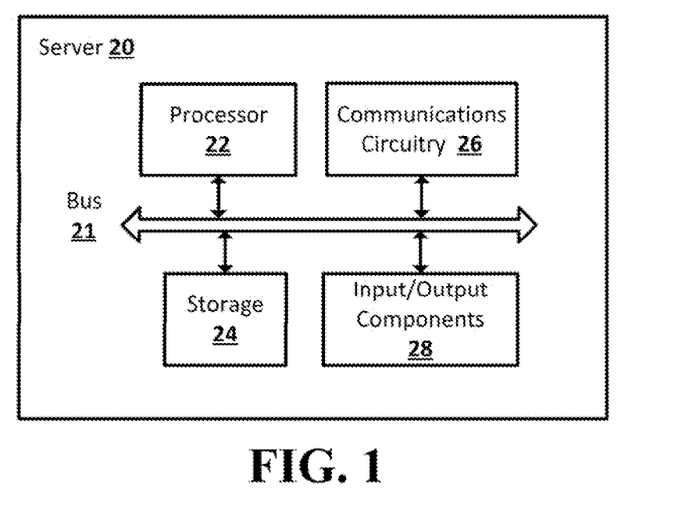
FIG. 1 shows a block diagram of a server according to an implementation of the disclosed subject matter.

FIG. 1 shows a block diagram of a server according to an implementation of the disclosed subject matter. The server 20 may include a bus 21 which interconnects major components of the server 20, such as a processor 22, a storage 24, communications circuitry 26, and input/output components 28.

The processor 22 may be any suitable programmable control device and may control the operation of one or more processes, such as authentication and content delivery as discussed herein, as well as other processes performed by the server 20.

The storage 24 may be integral with the server 20 or may be separate and accessed through an interface. The storage 24 may store content (e.g. video, music, photos, applications, and documents etc.), software (e.g., for implementing various functions on server 20), and any other suitable data. The storage 24 may include any suitable storage medium, such as one or more hard-drives, solid state drives, flash drives, and the like.

The input/output components 28 may include outputs components and/or interfaces for a display that provides visual output and may include a touch-sensitive screen. The input/output component may also include input components and/or interfaces for user input devices that allow a user to interact with the server 20. For example, the user input devices may include a keyboard, a keypad, a mouse, touchpad, a touch screen, and the like.

Figure 2:
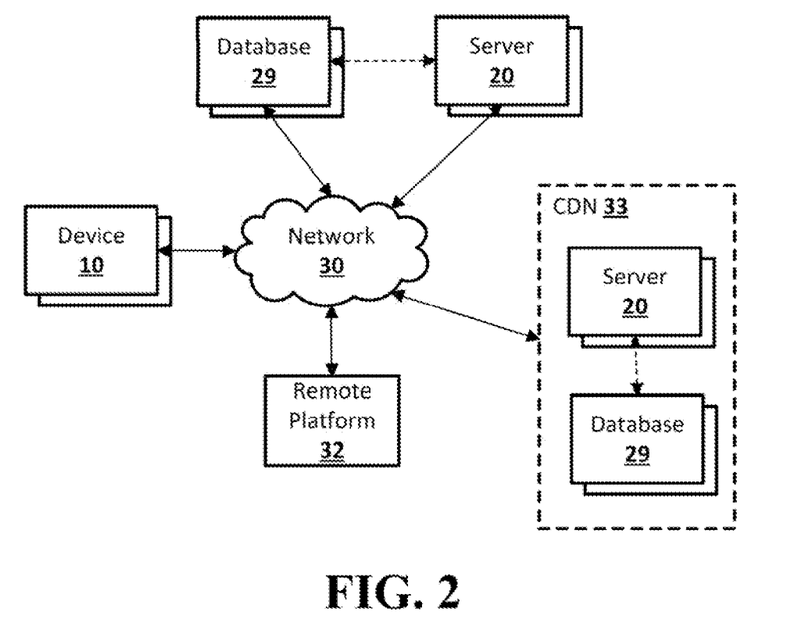
FIG. 2 shows an example network arrangement according to an implementation of the disclosed subject matter.

The communications circuitry 26 may include one or more interfaces to allow the server 20 to communicate with other servers 20, devices 10 and/or databases 29 via one or more local, wide-area, or other networks, as shown in FIG. 2. In addition, various high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor to control such communications intensive tasks such as packet switching, content management, and content delivery.

FIG. 2 shows an example network arrangement according to an implementation of the disclosed subject matter. Implementations may include one or more devices 10 which may include or be part of a variety of types of devices, such as a handheld device including a mobile phone or "smartphone," tablet computer, laptop, netbook, desktop, personal digital assistant ("PDA"), media device, set-top box, television, and/or watch, among others. The network 30 may be a local network, wide-area network (including the Internet), or any other suitable communication network or networks, and may be implemented on any suitable platform including wired and/or wireless networks. The devices 10 may communicate with other devices 10 and one or more servers 20 and/or databases 29.

The servers 20 may be directly accessible by the devices 10, or one or more other devices 10 may provide intermediary access to a server 20. The devices 10 and/or servers 20 may access remote platforms 32 or services provided by remote platforms 32 such as cloud computing arrangements and services. The remote platform 32 may include one or more servers 20 and/or databases 29. The term server may be used herein and may include a single server or one or more servers. For example, a server 20 may include one or more servers responsible for authentication, licensing, and delivering and/or storing content (which may be part of a Content Delivery Network (CDN) 33), or any combination thereof including additional or fewer types of servers.

Figure 3:
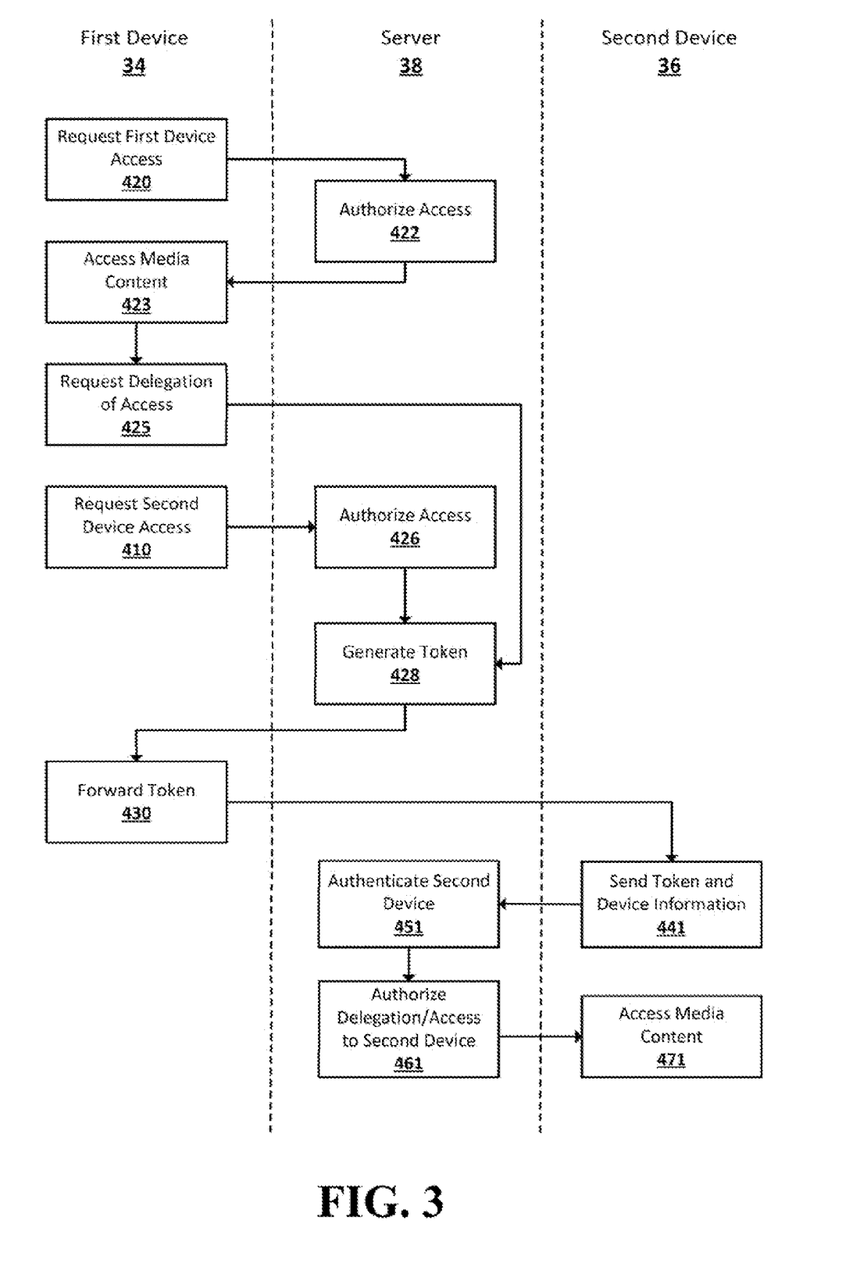
FIG. 3 shows an example flow diagram of securely authorizing access to media content from a first device to a second device according to an implementation of the disclosed subject matter.

FIG. 3 shows a flow diagram of a technique for securely authorizing or delegating access to media content from a first device to a second device according to an implementation of the disclosed subject matter. As shown, a server 38, which may, for example, correspond to server 20 shown in FIG. 1, may authorize access to media content by a second device 36 based on a request from a first device 34. The first device 34 and second device 36 may each correspond to a device 10 shown in FIG. 2. For example, the first device 34 may comprise a handheld device such as a smartphone and the second device 36 may comprise a media device such as set-top box. In one implementation, the first device 34 may request access to media content in 420. For example, a user may request assess to a movie from a content provider. Although examples described herein relate to media content as video content (e.g. movie, TV show, episode, clip, etc.), the media content may also include, for example, audio (e.g. music, radio, podcast, audio book, etc.), print (books, magazines, etc.), photos, applications ("apps"), documents, and others forms of media and/or content. The server 38 may receive the request from the first device 34 and may authorize access to the requested media content (e.g. the requested movie) in 422. The authorization may be based on verifying a user account associated with the first device 34. This user account may be saved and associated with the first device 34 or a user may be required to enter login information on the first device 34. For example, the user may be required to enter a user identification (user ID) and a password on the first device 34. This user account may be verified based on account information stored on the server 38. The server 38 may also use other methods for user authentication. For example, biometrics including fingerprint scanning and facial recognition may also be used to authenticate a user of the first device 34.

The authorization in 422 may also be based on authenticating the first device 34. For example, the server 38 may authenticate the first device 34 based on device identification information. The device identification information (or "identification") may include, for example, a unique device identifier including a proprietary device identifier, MAC address, public/private key encryption, or other suitable means for identifying a device.

Authorization to access the content in 422 may also require a verification of payment information. For example, if the movie is a premium movie (e.g. a newly released movie) the content provider may require a fee in order to access the movie. The user account may be associated with payment information already saved by the server 38 or payment information may be requested by the server 38. The payment information may include a credit card number and associated billing information (e.g. name, billing address etc.) or other forms of payment such as third party payment systems, email money transfer, e-check, direct withdrawal (e.g. from bank account), and the like.

Once access to the media content has been authorized, the first device 34 may access the media content in 423. Access to media content may include the ability to play, download, install, store, open, or otherwise "access" the content. For example, if the media content is a movie, the first device 34 may download and/or stream the media content. Once the first device 34 is authorized the access the media, the first device 34 may request that the server 38 delegate access to the media content to a second device 36 in 425. Delegating access may include the server 38 authorizing a second device 36 to access the authorized media content. For example, the first device 34 may be a handheld device and a user may wish to watch the movie on a Television that may be connected to a second device 36 (e.g. set-top box). In this example, the server 38 may delegate the authorization to stream the movie from the first device 34 to the second device 36. Instead of merely authorizing access to an additional device, delegation may be required based on DRM policies for the media content. For example, DRM policies may restrict the media content to be accessible by only one device at a time. Accordingly, access to the media content from a second device may require the access be delegated from one device to another. For example, delegation may require access from the first device 34 be disabled in order to enable access on the second device 36. The request to delegate access to media content in 425 may occur prior to the first device 34 actually accessing the media content (e.g. before streaming a movie, or opening a document) or may occur during or after the first device 34 has accessed the media content (e.g. after watching a portion of a movie). The request in 425 may include information such as identification information for the second device 36, media content identification information, and/or other information.

As described above, the user may request to delegate access 425 after the first device 34 has been authorized by the server 38 to access media content. In another implementation, the first device 34 may request that the second device 36 be authorized to access media content 410 before or without the first device 34 accessing the media content. For example, a user at a party may wish to view a movie on the host's shared media device, but may wish to order the movie from their own device using their own user account information. In this example, the second device 36 may be authorized to access the media content at the time the movie is ordered. The request may be based on a selected option when ordering the movie or from a specialized app or software installed on the first device 34 or second device 36. For example, the app or software may specifically request the user select a particular device that will access the selected media content. The request in 410 may include information such as identification information for the second device 36, media content identification information, and/or other information. In 426, the server 38 may authorize the access request in a similar manner as described above in 422.

Once the server 38 receives a request for delegation of access from 425 or authorizes the second device 36 to access media content in 426, the server may generate a token in 428. As described above, delegating or authorizing access to the second device 36 may be done in a secure manner. This may be accomplished by ensuring potentially sensitive information used for authentication (e.g. user account information) remains secure. In an implementation, the token may not be based on the user authentication information in any way, such that the authentication information cannot be derived from the token itself if the token is intercepted or otherwise accessed by an unintended entity. For example, the token may be a randomly generated alphanumeric value, and accordingly, authentication information may not be derived from the token. The token may also be based on or include a timestamp.

Once the token is generated, the server 38 may store the token and associate the token with identification information for the second device 36. The token and identification information may be stored in a storage or database that may be accessible by one or more servers. The server 38 may send the token to the first device 34 which may then forward the token in 430 to the second device 36. The second device 36 may use this token for authentication. In 441, the second device 36 may send the token and device information such as identification information for the second device to the server 38. The server may then authenticate the second device 36 using the token. For example, the server 38 may retrieve identification information associated with the received token. The server may compare the identification information associated with the token to identification information received from the second device 36. If the server 38 determines that the second device 36 is the device identified by the first device 34, the server 38 may authenticate the second device 36 in 451.

The server 38 may authorize access or delegation of the media content to the second device in 461 if the second device is authenticated in 451. This may include enforcing particular DRM policies. For example, if the server 38 authorizes a delegation, the server 38 may disable access by the first device 34 and allow the second device 36 to access the media content. In 471, the second device 36 may access the media content as described in 423. Using the same example as described above, the second device 36 may now stream a movie that was ordered with the first device 34.

Figure 4:
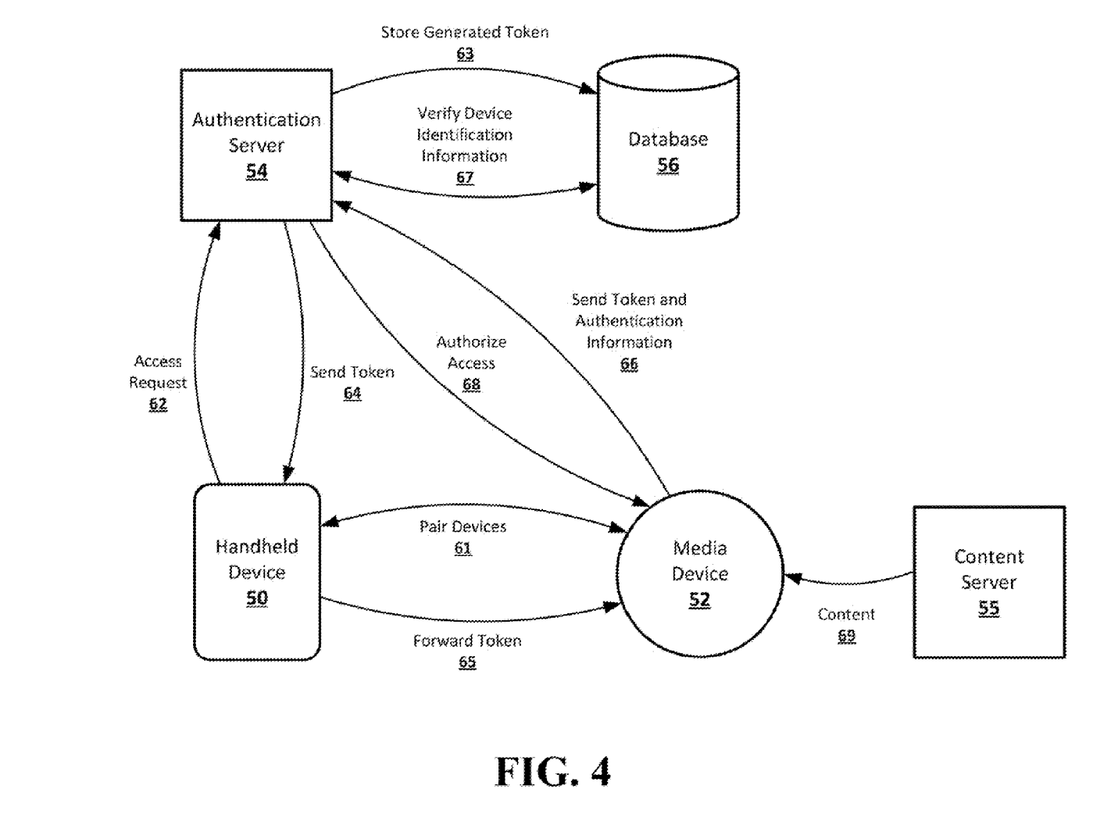
FIG. 4 shows an example system that securely authorizes access to media content from a first device to a second device according to an implementation of the disclosed subject matter.

FIG. 4 shows an example system that securely authorizes access to media content from a first device to a second device according to an implementation of the disclosed subject matter. In the example shown in FIG. 4, the system includes a handheld device 50 (e.g. first device 34), a media device 52 (e.g. second device 36), an authentication server 54 (e.g. server 38), a content server 55, and a database 56. As shown, a handheld device 50 may be paired with the media device 52. The pairing 61 may include any suitable form of connection which may include a one-way or a two-way communication. For example, the pairing may include a short range communication protocol (e.g. Bluetooth™), a connection through a local network connection (e.g. WiFi), through the internet, a cellular data network, and the like.

A request for access 62 (including a request to delegate access) from the handheld device 50 to the authentication server 54 may include second device identification information, content identification, or other information. The second device identification information may be associated with a device selected from a list of devices paired with the handheld device 50 in 61. The list of potentially paired devices may be limited to those that are within a local connection or within a physical proximity of the handheld device 50. This may provide an additional level of security by preventing an unintended third party outside of a physical location from attempting to gain unauthorized access to content. The second device identification information may include a unique device identifier or other device identification information as described herein. In the example shown in FIG. 4, the second device identification information may include an identification of the media device 52 (e.g. media device ID).

The authentication server 54 may generate a token upon authorizing access or a delegation of access and may store the generated token 63 in a database 56. When stored in the database 56, the generated token may be associated with the second device identification information, a content identifier, timestamp, or other information. The authentication server may send the token in 64 to the handheld device 50, which may then forward the token to the media device 52 in 65. The media device 52 may send the token along with authentication information to the authentication server 54 in 66. The authentication information may include second device identification information as described herein. The authentication server 54 may also initiate retrieval of the device identification information from the media device 52 or authenticate the identification information in other ways such as public/private key encryption or other means to validate that the device identification information is authentic. Once the authentication server 54 possesses the identification information from the media device 52 (e.g. media device ID), it may verify the media device ID by retrieving the second device identification information associated with the stored token in 67. By comparing the second device identification information received from the handheld device 50 to the media device ID from the media device 52, the authentication server 54 may ensure the intended device is authorized to access content. For example, if the token had been intercepted in 64 or 65, the unintended device would not have been authenticated because its device identification information would not match the identification information associated with the stored token.

Once the authentication server 54 authenticates the media device 52, the authentication server 54 may authorize access to the content by the media device 52 in 68. Authorizing access may include forwarding a license required to access the media content, which may be distributed to the media device 52 in 68. The authentication server 54 may interact with a licensing server (e.g. DRM provider) to obtain the license, in which case a licensing server may forward the license to the authentication server 54, or may send the license directly to the handheld device 50. The license may be encrypted and/or may include a key required the decrypt the content. For example, the license may be a key required to decrypt a movie for viewing.

The media device 52 may obtain the requested content from a server such as a content server 55 in 69. The media device 52 may use the license to access the media content. For example, the media device 52 may retrieve content from the content server 55 and may access the content (e.g. stream), which may include decrypting the content using the obtained license. Communications within the system may use one or more secure protocols. For example, a secure protocol may include a secure sockets layer (SSL) protocol, or other suitable method when communicating within the system.

Figure 5:
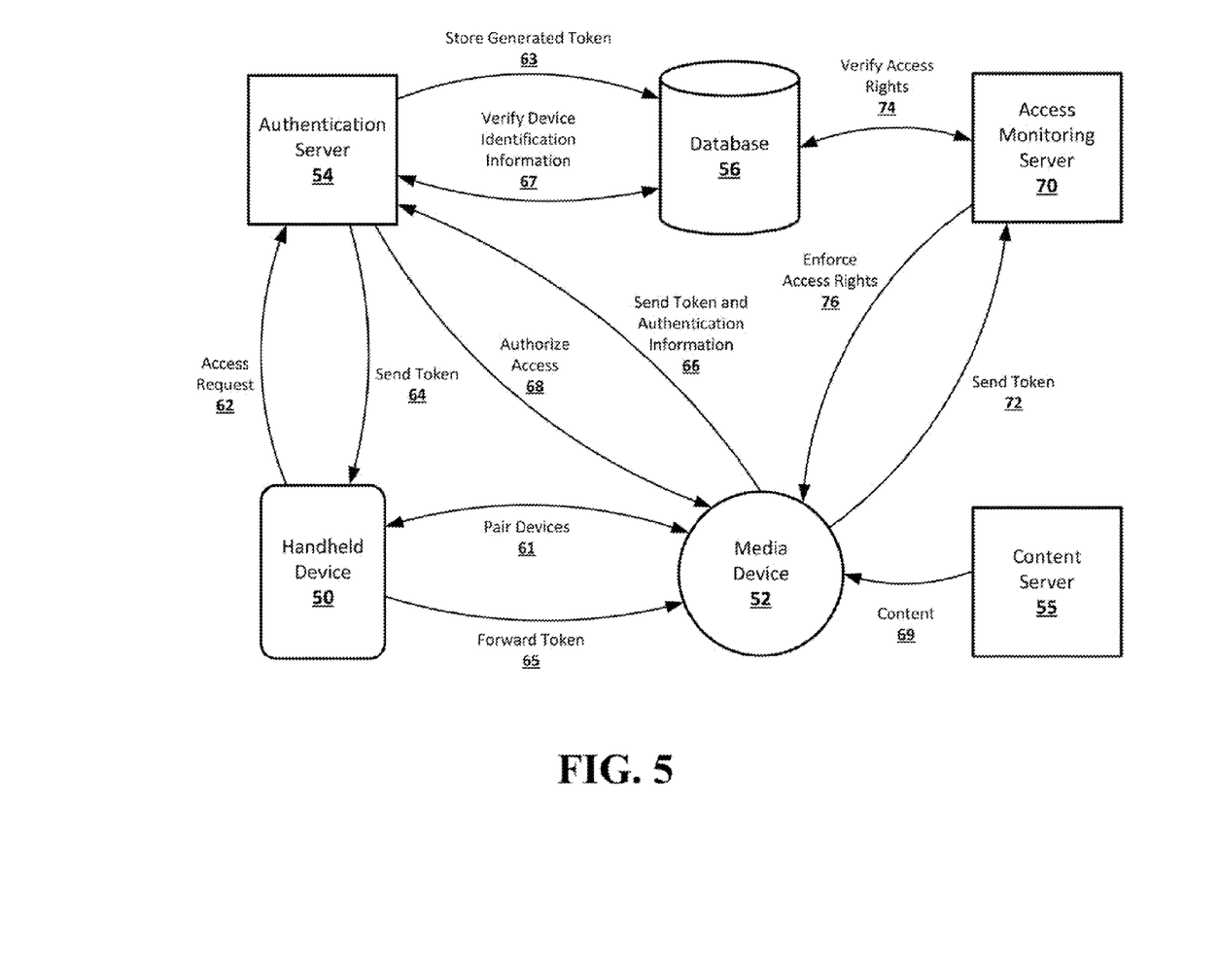
FIG. 5 shows an example system of FIG. 4 including an access monitoring server according to an implementation of the disclosed subject matter.

FIG. 5 shows the example system of FIG. 4 including an access monitoring server according to an implementation of the disclosed subject matter. The system in FIG. 4 may include an access monitoring server 70. The access monitoring server may monitor additional access rights to the content by the media device 52. The media device 52 may send the token to the access monitoring server 70 at predefined times in 72. The access monitoring server 70 may verify access rights to the content based on information associated with the token in 74. Based on the access rights, the access monitoring server 70 may enforce access rights on the media device 52 in 76. For example, if a user requests a refund after ordering the media content, the access monitoring server 70 can enforce access rights after the initial access authorization by the authentication server 54. For example, the access monitoring server can enforce or indicate that authorization to view the media content has been verified for continued access or terminated. DRM policies may require the access rights be monitored at predefined times such as hourly, daily, etc. The access monitoring server 70 may also enforce other access rights such as limiting access to within a particular time period (e.g. within 24 hours), limiting concurrent access (e.g. concurrent streaming), limiting the number of devices or IP addresses that may access the content, and other access rights that may conform to a particular DRM policies. It should be noted that although the authentication server 54, content server 55, access monitoring server 70, and database 56 are shown as separate components in FIGS. 4 and 5, they may be included within a CDN or a single server (e.g. server 38).

Various implementations of the disclosed subject matter may include or be embodied in the form of computer-implemented processes and apparatuses for practicing those processes. Implementations also may be embodied in the form of a computer program product having computer program code containing instructions embodied in non-transitory and/or tangible media, such as hard drives, USB (universal serial bus) drives, floppy diskettes, CD-ROMs, or any other machine readable storage medium, wherein, when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The flow diagrams described herein are just examples. There may be variations to these diagrams or the steps (or operations) described therein without departing from the implementations described. For instance, the steps may be performed in a differing order, or steps may be added, deleted or modified.

References to "one implementation," "an implementation," "an example implementation," and the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be included in other implementations whether or not explicitly described. The term "substantially" may be used herein in association with a claim recitation and may be interpreted as "as nearly as practicable," "within technical limitations," and the like.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method of securely authorizing access to media content, comprising:
   receiving, from a first device, a first identification of a second device and a request to authorize access to the media content by the second device;
   verifying a user account associated with the first device;
   generating a token in a manner that prevents authentication information of a user of the first device from being derived from the token, the token being a randomly generated or arbitrary value;
   associating the token with the first identification received from the first device;
   sending the token to the first device, the token to be sent from the first device to the second device;
   receiving, from the second device, the token and a second identification of the second device;
   authenticating the second device based on comparing the second identification received from the second device to the first identification associated with the received token; and
   authorizing access to the media content by the second device based on said
   authenticating and while the second device is associated with a user account different from the user account associated with the first device.

2. The method of claim 1, wherein said verifying further includes verifying payment information associated with the user account associated with the first device.

3. The method of claim 1, wherein the second device is paired with the first device through a local wireless connection.

4. The method of claim 1, further comprising disabling access to the media content by the first device upon said authorizing the second device.

5. The method of claim 1, wherein said authorizing access by the second device includes providing the second device with a license required to access the media content.

6. The method of claim 1, wherein said authorizing access by the second device includes providing the second device with a key required to decrypt the media content and wherein the media content comprises a video.

7. The method of claim 1, wherein the token comprises an arbitrary value.

8. The method of claim 1, wherein the method is performed within a Content Distribution Network (CDN).

9. A method of securely authorizing access to media content, comprising:
   receiving, from a first device, a request to access the media content;
   authorizing access to the media content by the first device based on information received from the first device;
   receiving, from the first device, a first identification of a second device and a request to delegate access to the authorized media content to the second device;
   generating a token in a manner that prevents authentication information of a user of the first device from being derived from the token, the token being a randomly generated or arbitrary value;
   associating the token with the first identification received from the first device;
   sending the token to the first device, the token to be sent from the first device to the second device;
   receiving, from the second device, the token and a second identification of the second device;
   authenticating the second device based on comparing the second identification received from the second device to the first identification associated with the received token; and
   delegating access to the authorized media content to the second device based on said authenticating and while the second device is associated with a user account different from a user account associated with the first device.

10. The method of claim 9, wherein said authorizing access to the media content by the first device further includes verifying the user account associated with the first device.

11. The method of claim 10, wherein said authorizing access to the media content by the first device further includes verifying payment information of the user account associated with the first device.

12. The method of claim 9, wherein the second device is paired with the first device through a local wireless connection.

13. The method of claim 9, wherein said authorizing access to the media content by the first device includes authenticating the first device.

14. The method of claim 9, further comprising disabling access to the media content by the first device upon said delegating access to the second device.

15. The method of claim 9, wherein the token comprises an arbitrary value.

16. The method of claim 9, wherein the method is performed within a Content Distribution Network (CDN).

17. A system for securely authorizing access to media content, comprising a first server, the first server comprising:
   communications circuitry configured to connect to a first device and a second device; and
   a processor configured to:
      receive, from the first device, a first identification of the second device and a request to authorize access to the media content by the second device;
      verify a user account associated with the first device;
      generate a token in a manner that prevents authentication information of a user of the first device from being derived from the token, the token being a randomly generated or arbitrary value;
      associate the token with the first identification received from the first device;

send the token to the first device, the token to be sent from the first device to the second device;

receive, from the second device, the token and a second identification of the second device;

authenticate the second device based on comparing the second identification received from the second device to the first identification associated with the received token; and authorize access to the media content by the second device based on authentication of the second device and while the second device is associated with a user account different from the user account associated with the first device.

18. The system of claim 17, wherein the second device comprises:

communications circuitry configured to connect to the first device and the first server; and a processor configured to:
connect the second device to the first device through a local wireless connection;

share identification information with the first device through the local wireless connection;

receive, from the first device, the token;

send the token and the second identification of the second device to the first server; and access the media content upon the first server authorizing access to the media content by the second device.

19. The system of claim 17, wherein the processor of the first server is further configured to provide the second device with a license required to access the media content and wherein the processor of the second device is further configured to play the media content using the provided license.

20. A system for securely delegating access to media content, comprising a first server, the first server comprising:

communications circuitry configured to connect to a first device and a second device; and a processor configured to:
receive, from the first device, a request to access the media content;

authorize access to the media content by the first device based on information received from the first device;

receive, from the first device, a first identification of the second device and a request to delegate access to the authorized media content to the second device;

generate a token in a manner that prevents authentication information of a user of the first device from being derived from the token, the token being a randomly generated or arbitrary value;

associate the token with the first identification received from the first device;

send the token to the first device, the token to be sent from the first device to the second device;

receive, from the second device, the token and a second identification of the second device;

authenticate the second device based on comparing the second identification received from the second device to the first identification associated with the received token; and delegate access to the authorized media content to the second device based on authentication of the second device and while the second device is associated with a user account different from a user account associated with the first device.

* * * * *